(12) United States Patent
Sullivan

(10) Patent No.: US 6,905,450 B2
(45) Date of Patent: Jun. 14, 2005

(54) CLAM SHELL CONTAINER WITH COVER AND INNER TRAY

(75) Inventor: Raymond Sullivan, Waterbury, CT (US)

(73) Assignee: International Paper Company, Stamford, CT (US)

( * ) Notice: Subject to any disclaimer, the term of this patent is extended or adjusted under 35 U.S.C. 154(b) by 0 days.

(21) Appl. No.: 10/729,994

(22) Filed: Dec. 9, 2003

(65) Prior Publication Data

US 2004/0116265 A1 Jun. 17, 2004

Related U.S. Application Data

(62) Division of application No. 10/057,994, filed on Jan. 29, 2002, now Pat. No. 6,685,022.

(51) Int. Cl.$^7$ ............................................... B31B 1/60
(52) U.S. Cl. ......................... 493/84; 493/128; 493/150
(58) Field of Search ......................... 493/84, 128, 150, 493/374, 379, 382, 946

(56) References Cited

U.S. PATENT DOCUMENTS

| | | | |
|---|---|---|---|
| 3,355,081 A | | 11/1967 | Kachurchak |
| 3,445,052 A | | 5/1969 | Lewallen |
| 3,654,053 A | | 4/1972 | Toedter |
| 4,374,441 A | * | 2/1983 | Carter et al. .................... 412/3 |
| 4,600,346 A | * | 7/1986 | Podosek ......................... 412/3 |
| 4,641,750 A | * | 2/1987 | Johnson et al. ........ 206/387.13 |
| 4,694,954 A | | 9/1987 | Moss |
| 4,717,021 A | * | 1/1988 | Ditzig ................... 206/387.13 |
| 5,415,288 A | | 5/1995 | Ozaki |
| 5,595,293 A | * | 1/1997 | Miller ...................... 206/308.1 |
| 5,682,990 A | * | 11/1997 | Schluger .................. 206/308.1 |
| 5,871,323 A | * | 2/1999 | Clark ............................ 412/4 |
| 6,132,349 A | | 10/2000 | Yokoyama |
| 6,290,060 B1 | | 9/2001 | Burtch |
| 6,364,590 B1 | * | 4/2002 | Gayoso ....................... 412/18 |
| 6,672,815 B2 | * | 1/2004 | Parker et al. ................. 412/33 |

* cited by examiner

Primary Examiner—Eugene Kim
(74) Attorney, Agent, or Firm—Melvin D. Fletcher

(57) ABSTRACT

The clam shell container is formed by a cover formed of cardboard, chipboard or other similar material. A thermoform plastic tray is adhered to the inner surface of the cover to form the completed clam shell container. When closed, the edges of the tray move closer to the edges of the cover. The thermoform is bonded to the tray with adhesive and the container is closed to allow the adhesive to cure in the closed configuration. When opened, stress is created by the tray being fixed to the cover. To alleviate the stress, perforations between the tray sections and the spine break forming three distinct sections. In the open configuration, a small gap is created between the tray section and the spine.

5 Claims, 3 Drawing Sheets

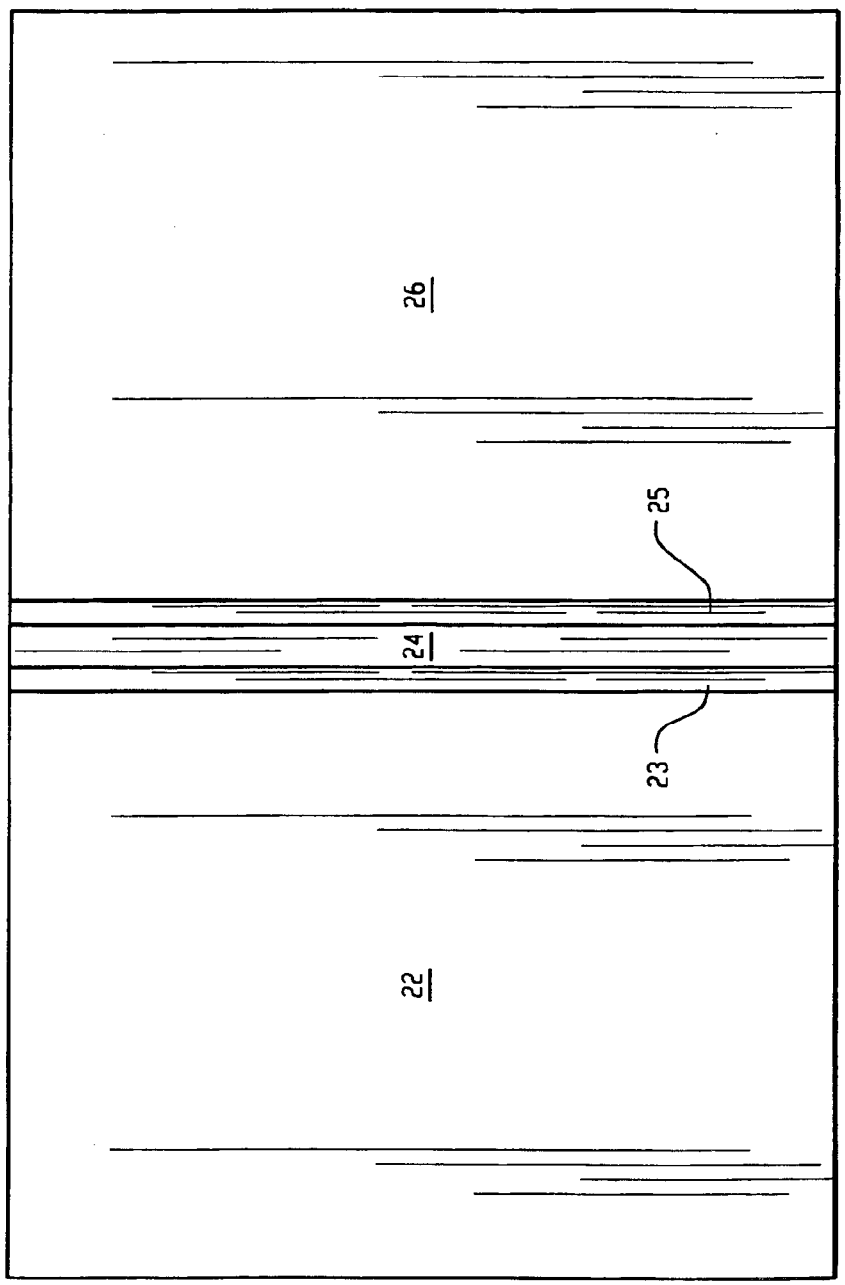
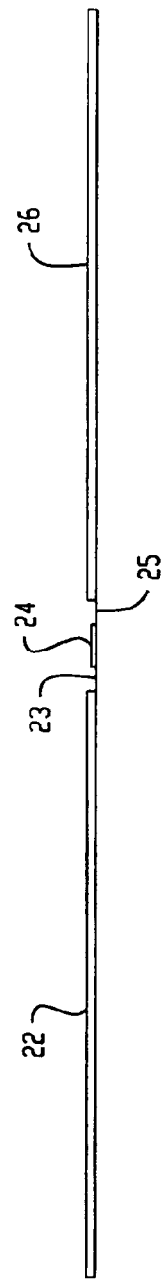
Fig. 1
Fig. 2

CLAM SHELL CONTAINER WITH COVER AND INNER TRAY

This application is a divisional of Ser. No. 10/057,994, filed Jan. 29, 2002 now U.S. Pat. No. 6,685,022.

BACKGROUND OF THE INVENTION

Items such as DVD's, CD's and VHS cassettes are conventionally packaged in clam shell containers. The clam shell containers are formed by a back cover and a front cover, each hinged to a spine. The remaining three sides of the package are formed by flanges extending from the front and back cover. The inside surface of both the front and back cover form trays for receiving the item. Often, the whole clam shell container is made from a single piece of molded plastic.

A more aesthetically pleasing package is formed by a cover made of material such as cardboard, paperboard or chipboard and having plastic trays adhered to the inner surface of the cover. Both the cover and tray are formed with a back and a front hingedly connected to a spine. Problems have arisen with this type of package having two layers adhered together and folded into the clam shell configuration.

When a clam shell container formed from two layers of material is assembled, the hinges of the tray are aligned with the hinges of the cover. Difficulty arises in the fact that, when folded, the hinges of the tray having a smaller radius of curvature than the hinges of the cover. The result is that the alignment between the cover and tray is different in the opened and closed positions. Stress placed on the hinges of the tray when the tray is adhered to, and confined by, the cover in the closed geometry and subsequently opened.

The prior art has addressed this problem in the past. U.S. Pat. No. 3,355,081 (Kachurchak) discloses a plastic liner on a cardboard box having a notch removed from the liner along fold lines. Also, U.S. Pat. No. 3,654,053 (Toedter) discloses a laminate having material removed from the inner layer along fold lines to facilitate the folding operation. When a tray is thermoformed, however, there is no continuous face-to-face adhesion between the tray and the cover. Also, with these prior art solutions, the laminate has to be fully set before the removal material is performed.

It is an object of the invention to provide a clam shell container formed by a cover and tray adhered together accounting for the change in alignment between the two during opening.

It is another object of the invention to provide a clam shell container made by a cover and tray adhered together when the tray is a single piece.

It is another object of the invention to provide an aesthetically pleasing clam shell container, yet inexpensive to manufacture.

It is another object of the invention to provide a clam shell container having a cover and tray reducing stress in the package inherent from the repeated opening and closing of the container.

These and other objects of the invention will become apparent after reading the disclosure of the invention.

SUMMARY OF THE INVENTION

The clam shell container is formed by a cover formed of cardboard, chipboard or other similar material. A thermoform plastic tray is adhered to the inner surface of the cover to form the completed clam shell container. When closed, the edges of the tray move closer to the edges of the cover and the adhesive is allowed to set. When laid open flat, the distance between the edge of the tray and the end cover would increase if not constrained by the bonding. In order to alleviate the stress that occurs when the two are bonded together, the tray is formed with perforations between the left and right tray section and the spine. Once in the open configuration, a small gap is created between the tray sections and the spine.

BRIEF DESCRIPTION OF THE DRAWINGS

FIG. 1 is a plan view of the cover;

FIG. 2 is a edge view of the cover;

DETAILED DESCRIPTION OF THE INVENTION

Figure 3:
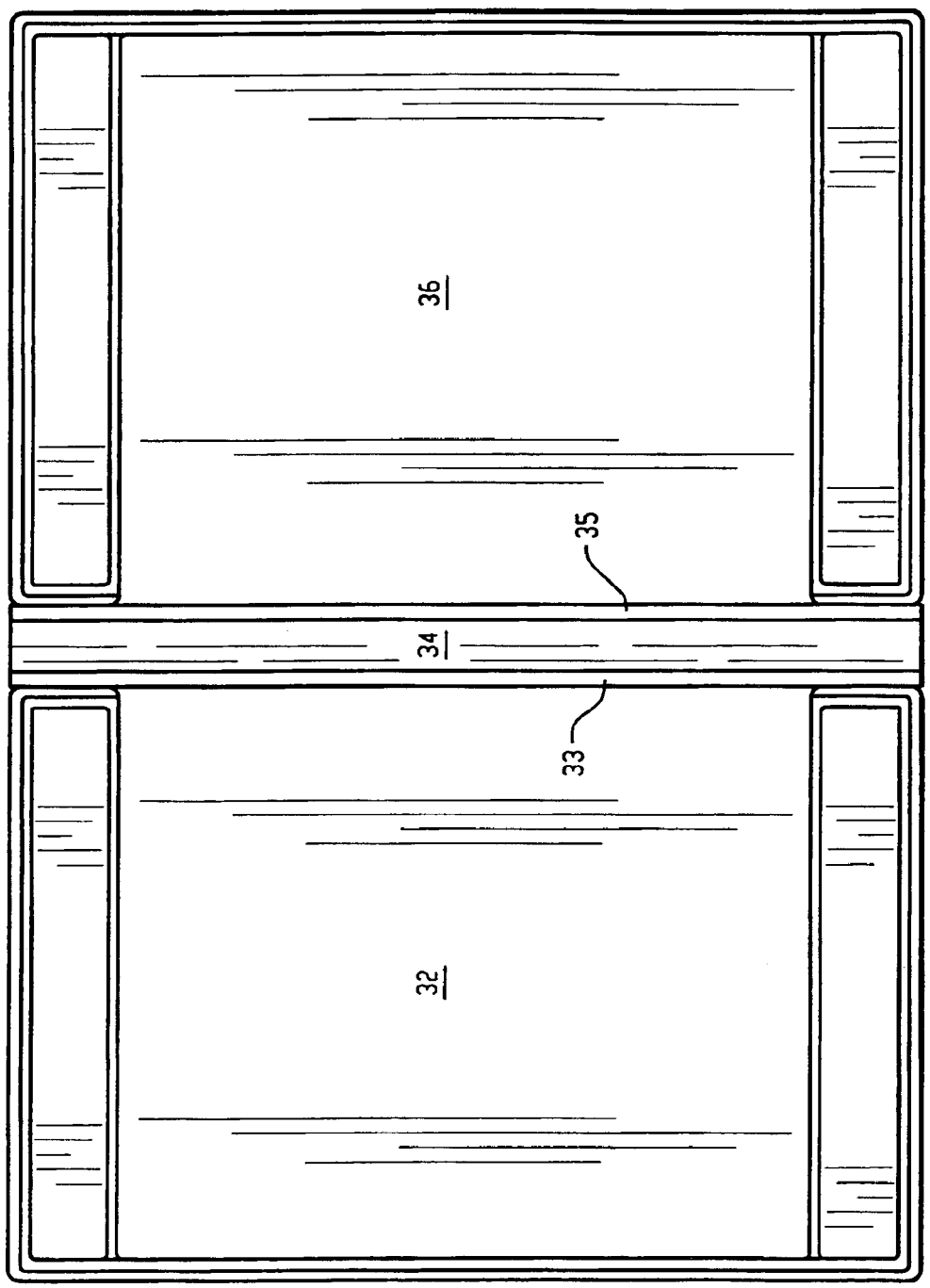
FIG. 3 is a plan view of the tray.
Figure 4:
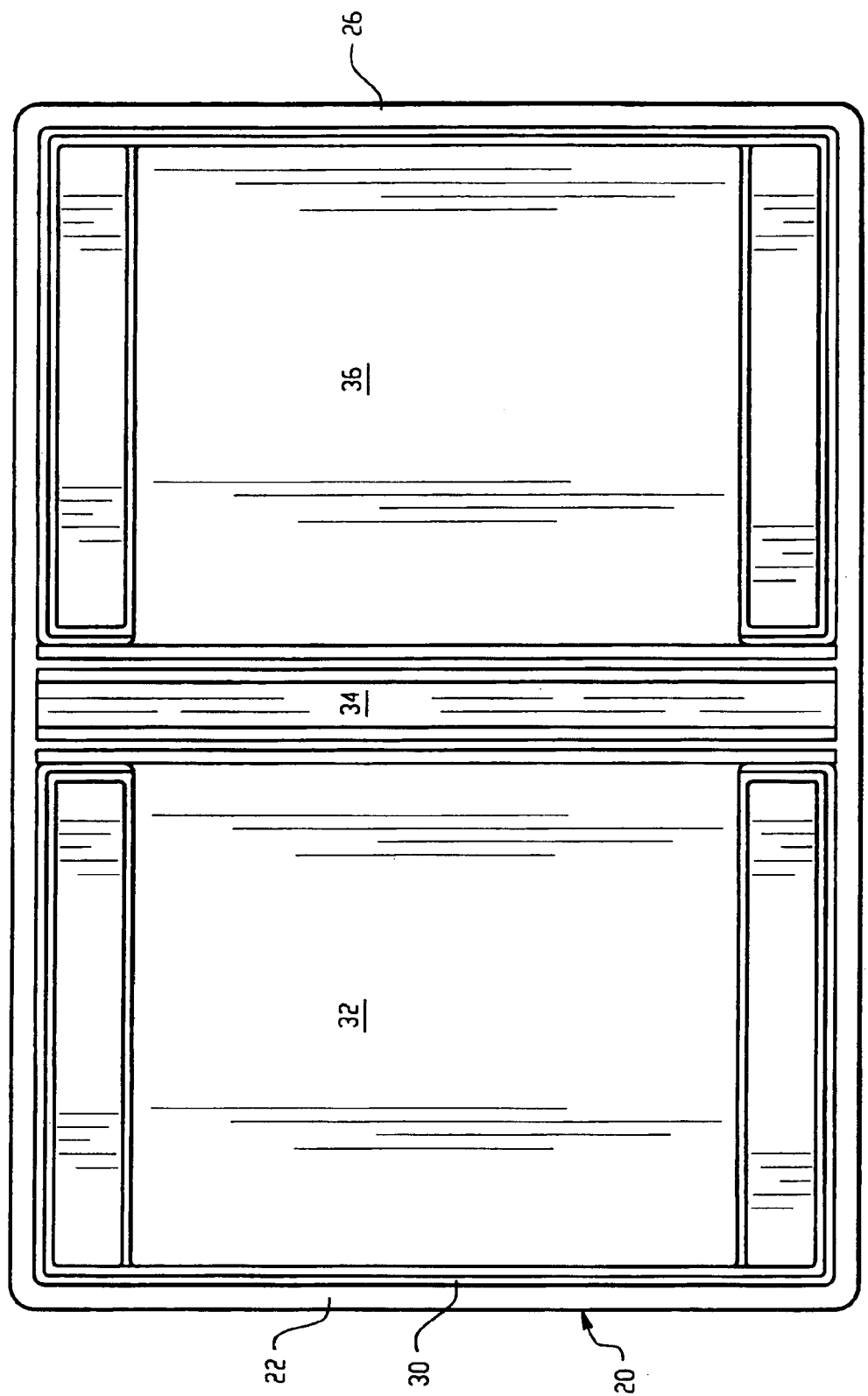
FIG. 4 is a view of the completed container after initial opening.

The container 10 is made of a cover 20 and tray 30 adhered to one another. The cover 20 can be seen in FIG. 1. The cover consists of a front 22 and a back cover 26 hinged to a spine 24. A first hinge 23 connects the front 22 to the spine 24. Likewise, a second hinge 25 connects the back 26 to the hinge 24. An edge view of the cover is seen in FIG. 2. In the illustrated embodiment, the front 22 and back 26 have a first thickness whereas the spine 24 has a second thickness smaller than that of the front and back. Also, the hinges 23 and 25 have the smallest thickness to aid in the bending movement. In the preferred embodiment, the cover is made up of pasted chipboard having a black craft liner. Alternatively, the cover can be made of corrugated cardboard or paperboard. In such instances, the natural resilience of such material provides a natural hinge, as is known in the art.

The tray 30 is illustrated in FIG. 3 where it can be seen to have a front 32, a spine 34 and a back 36. A first hinge 33 connects the front 32 to the spine 34 and a second hinge 35 connects the spine to the back 36. Each of the hinges 33, 35 is provided with perforations, the purpose of which will become clear later. In the preferred embodiment, each perforated line has six perforations measuring 0.025 inches and three perforations measuring 0.040 inches.

To assemble the container 10, the cover 20 is laid flat. The tray is coated with adhesive and centered on the cover. Once centered, the first and second hinge 23, 25 of the cover 20 are aligned with the first and second hinge 33, 35 of the tray 30. A space is created between the left, right, top and bottom edge of the tray with the corresponding left, right, top and bottom edge of the cover. After centering, the container 10 is closed and the adhesive allowed to set.

When the container is closed, the cover and tray can move relative one another. As the respective hinges of the cover and tray are bent, the hinges of the tray have a smaller radius of curvature than the hinges of the cover. A smaller radius of curvature results in less distance being traveled by the tray than the cover. The net result is for the edges of the tray to move closer to the edges of the cover. Once the adhesive is set with the container closed, the tray is fixed in location relative to the cover. When the ultimate consumer opens the container for the first time, the fixed location of the tray relative to the cover causes stress along the hinges 33, 35 of the tray as it opens to a flat configuration. The hinges of the cover 23, 25 cover a greater distance in the laid open configuration than the hinges of the tray. This stress causes the breaking of the perforations. When the perforations break, the spine is separated from each of the tray sections by approximately 1/16 of an inch. This alleviates any stress in the tray 30, but allows the manufacturing to take place with a one piece tray, rather than three separate pieces.

While the invention has been described with reference to a preferred embodiment, variations and modifications of the invention would be apparent to one of ordinary skill in the art. The invention covers such variations and modifications. For instance, the perforated lines may be replaced with a line of weakness in the hinge formed by a line of reduced thickness or any other type of structure allowing for separation between the spine and the front and back of the tray.

I claim:

1. A method of making a container comprising:

providing a cover of a sheet material having a first perimetral dimension and a substantially centrally located spine;

providing a tray having a second perimetral dimension which is complementary with, but smaller than, said first perimetral dimension, and a substantially centrally located spine;

disposing said sheet material in an attitude for the receipt of said tray in overlying relationship thereto;

disposing said tray in overlying relationship to said cover with said tray being oriented substantially centrally of said cover and having its spine overlying and aligned with said cover spine;

interposing an adhesive between said cover and said overlying tray;

prior to curing of said adhesive, simultaneously folding said cover and said overlying tray about their respective hinge line interconnections with their respective spines whereby said first and second side portions of said receptacle move in a direction outwardly from said overlying spines, said outward movement of said first and second side portions of said tray align at least one of their respective side edges with the corresponding side edge of said cove;

maintaining said cover and said tray in said folded relationship at least until said adhesive is cured to the extent that unfolding of said cover and tray does not displace said tray relative to said cover; and reducing the tensile strength of said hinge interconnections of said first and second side portions of said tray to said tray spine to a value sufficiently less than the tensile strength of said spine and said first and second side portions of said tray to the extent that when said folded cover and tray are unfolded following curing of said adhesive, said hinge interconnections at least partially rupture, thereby permitting said cover to swing to its original unfolded position without inward movement of said first and second side portions of said tray relative to said first and second side panels of said cover.

2. The method of claim 1 wherein said tensile strength reduction is accomplished by perforations aligned with one another along said hinged interconnections of said first and second side portions of said tray to said tray spine.

3. A method of making a container comprising:

providing a cover of a sheet material having a first perimetral dimension and a substantially centrally located spine;

providing a tray having a second perimetral dimension which is complementary with, but smaller than, said first perimetral dimension, and a substantially centrally located spine;

disposing said sheet material in an attitude for the receipt of said tray in overlying relationship thereto;

disposing said tray in overlying relationship to said cover with said tray being oriented substantially centrally of said cover and having Its spine overlying and aligned with said cover spine;

interposing an adhesive between said cover and said overlying tray;

prior to curing of said adhesive, simultaneously folding said cover and said overlying tray about their respective hinge line interconnections with their respective spines whereby said first and second side portions of said receptacle move in a direction outwardly from said overlying spines;

maintaining said cover and said tray in said folded relationship at least until said adhesive is cured to the extent that unfolding of said cover and tray does not displace said tray relative to said cover; and unfolding of said folded tray and cover effects physical disengagement of at least substantial portions of said first and second tray portions from respective sides of said tray spine.

4. The method of claim 3 wherein said physical separation develops an open gap between said spine and each of said first and second portions of said tray.

5. The method of claim 4 wherein said gap is about 1/16 inch.

* * * * *